US011344800B2

(12) United States Patent
Peitzer et al.

(10) Patent No.: US 11,344,800 B2
(45) Date of Patent: *May 31, 2022

(54) VIRTUALIZED GAMING EMULATION AS A NETWORK SERVICE

(71) Applicants: AT&T Intellectual Property I, L.P., Atlanta, GA (US); AT&T Mobility II LLC, Atlanta, GA (US)

(72) Inventors: Haywood S. Peitzer, Randolph, NJ (US); David Peitzer, Bedminster, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/102,635

(22) Filed: Nov. 24, 2020

(65) Prior Publication Data

US 2021/0093964 A1    Apr. 1, 2021

Related U.S. Application Data

(63) Continuation of application No. 15/996,044, filed on Jun. 1, 2018, now Pat. No. 10,874,941.

(51) Int. Cl.
*A63F 13/355* (2014.01)
*A63F 13/332* (2014.01)

(52) U.S. Cl.
CPC .......... *A63F 13/355* (2014.09); *A63F 13/332* (2014.09); *A63F 2300/209* (2013.01)

(58) Field of Classification Search
CPC . H04W 36/0011; H04W 40/02; H04W 40/04; H04W 40/12; A63F 13/355; A63F 2300/209; A63F 13/332
See application file for complete search history.

(56) References Cited

U.S. PATENT DOCUMENTS 8,676,949 B2    3/2014 Vilke et al.
8,831,014 B2 *  9/2014 Koodli .................. H04W 28/08
                                          370/401

(Continued)

FOREIGN PATENT DOCUMENTS

JP      5729003 B2    6/2015
JP      5863771 B2    2/2016
JP    2017527151 A1   9/2017

OTHER PUBLICATIONS

Non-Final Office Action received for U.S. Appl. No. 15/996,044 dated May 29, 2020, 26 pages.

(Continued)

*Primary Examiner* — Thomas J Hong
*Assistant Examiner* — Carl V Larsen
(74) *Attorney, Agent, or Firm* — Amin, Turocy & Watson, LLP

(57) ABSTRACT

Virtualized gaming as a network service is provided where instead of using a cloud based virtualized gaming console, a virtual machine can be instantiated at an edge network device in a radio access network to decrease the latency of communications between the user equipment device and the virtualized gaming console. Another virtue of placing the gaming console in the network is that the processing, memory storage and other hardware requirements can be offloaded to the network, allowing the user equipment device to be able to handle a broad range of games, without being limited by processing power and battery usage. The user equipment device can be treated as a thin-client device, receiving control data, video data, and audio data that can be played back at the user equipment device.

20 Claims, 10 Drawing Sheets

(56) References Cited

U.S. PATENT DOCUMENTS

| | | | |
|---|---|---|---|
| 8,918,455 | B2 | 12/2014 | Vilke et al. |
| 9,001,733 | B2 | 4/2015 | Kalmbach et al. |
| 9,019,937 | B2 | 4/2015 | Kalmbach et al. |
| 9,072,042 | B2 | 6/2015 | Berg et al. |
| 9,100,405 | B2 | 8/2015 | Twitchell |
| 9,178,802 | B2 | 11/2015 | Berg et al. |
| 9,405,499 | B2 | 8/2016 | Husain et al. |
| 9,781,246 | B2 | 10/2017 | Das et al. |
| 9,843,485 | B2 | 12/2017 | Desai et al. |
| 9,948,544 | B2 | 4/2018 | Strijkers et al. |
| 10,874,941 | B2 * | 12/2020 | Peitzer .................. A63F 13/332 |
| 2013/0260896 | A1 * | 10/2013 | Miura .................. A63F 13/795 463/42 |
| 2013/0265936 | A1 * | 10/2013 | Berg ..................... H04W 8/082 370/328 |
| 2015/0055623 | A1 * | 2/2015 | Li ........................ H04W 40/04 370/331 |
| 2016/0089606 | A1 | 3/2016 | Javed et al. |
| 2016/0359675 | A1 | 12/2016 | Chen et al. |
| 2018/0139266 | A1 | 5/2018 | Twitchell |
| 2019/0246252 | A1 * | 8/2019 | Rasmusson ............. H04W 4/38 |
| 2019/0380033 | A1 * | 12/2019 | Wu ....................... H04L 9/0841 |
| 2019/0384644 | A1 * | 12/2019 | Fear ..................... A63F 13/358 |
| 2019/0394825 | A1 * | 12/2019 | Byun ................... H04W 76/11 |

OTHER PUBLICATIONS

Osanaiye, Opeyemi, et al. "From cloud to fog computing: A review and a conceptual live VM migration framework." IEEE Access, vol. 5, pp. 8284-8300, 2017. 17 pages.

Hong, Hua-Jun, et al. "Placing Virtual Machines to Optimize Cloud Gaming Experience." IEEE Transactions on Cloud Computing, Jan. 2015. 13 pages.

Elbamby, Mohammaed S., et al. "Towards Low-Latency and Ultra-Reliable Virtual Reality" arXiv:1801.07587v1 [cs.IT] Jan. 23, 2018. 8 pages.

Vasona Networks. "Vasona Networks Unveils Mobile Edge Breakout Application to Power New Low Latency Services." http://vasonanetworks.com/2018/02/14/vasona-networks-unveils-mobile-edge-breakout-application-powernew-low-latency-services/. Last Accessed Aug. 27, 2018.

Hou, Xueshi, et al. "Wireless VR/AR with Edge/Cloud Computing" IEEE International Conference on Computer Communications and Networks. 2017. 8 pages.

"A Platform for Computing at the Mobile Edge: Joint Solution with HPE, Saguna, and AWS," AWS, d1.awsstatic.com, Feb. 2018 29 pages.

Bach, Matt. "Multi-headed VMWare Gaming Setup," Puget Systems, pugetsystems.com, Jul. 9, 2014 11 pages.

* cited by examiner

VIRTUALIZED GAMING EMULATION AS A NETWORK SERVICE

RELATED APPLICATION

The subject patent application is a continuation of, and claims priority to, U.S. patent application Ser. No. 15/996,044 (now U.S. Pat. No. 10,874,941), filed Jun. 1, 2018, and entitled "VIRTUALIZED GAMING EMULATION AS A NETWORK SERVICE," the entirety of which application is hereby incorporated by reference herein

TECHNICAL FIELD

The present application relates generally to the field of gaming as a service, and more specifically using a virtual machine in an edge network device to virtualize a game console.

BACKGROUND

Game applications are typically executed locally as processing requirements and latency requirements are significant. The hardware requirements mean that gamers may buy multiple game consoles, personal computers, and other devices necessary to operate the games. Gaming on mobile devices are further limited by the processing power, battery requirements, memory storage, and other hardware limitations facing mobile devices. Traditional gaming as a service, where game applications are executed in the cloud, does not satisfy the requirements of gaming however as there can high latency when interacting with a cloud server.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
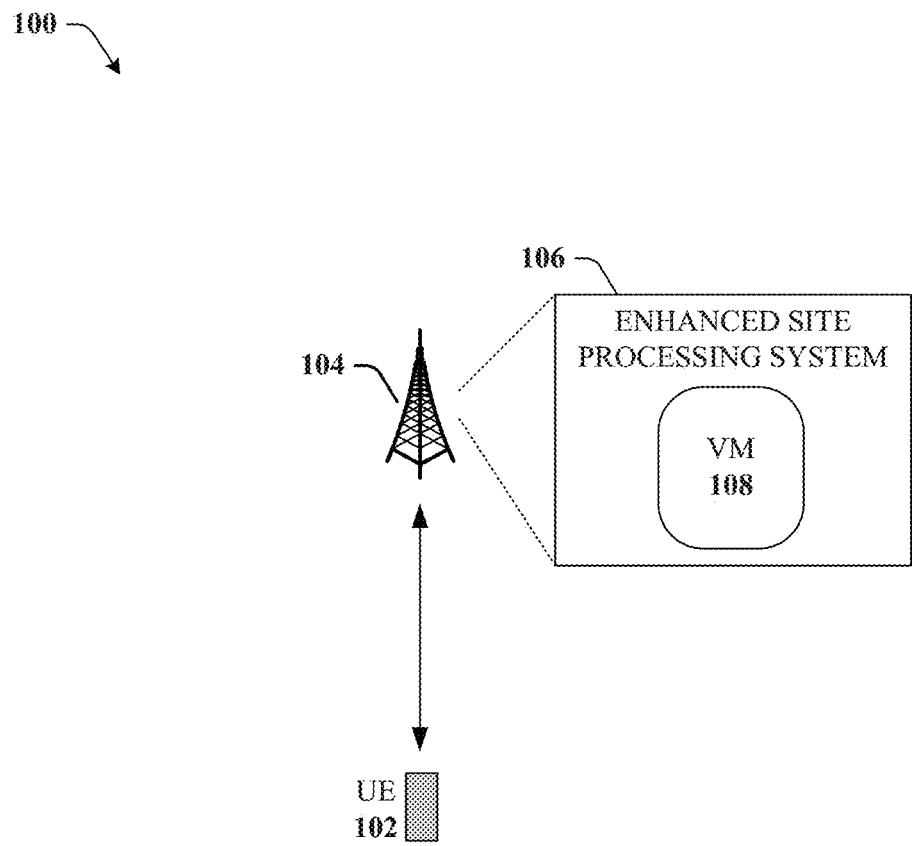
FIG. 1 illustrates an example block diagram showing an edge network device with a virtual machine in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for virtualized gaming as a network service. Instead of using a cloud based virtualized gaming console, a virtual machine can be instantiated at an edge network device in a radio access network to decrease the latency of communications between the user equipment device and the virtualized gaming console. Another virtue of hosting the gaming console in the network is that the processing, memory storage and other hardware requirements can be offloaded to the network, allowing the user equipment device to be able to handle a broad range of games, without being limited by processing power and battery usage. The user equipment device can be treated as a thin-client device, receiving control data to facilitate control of the game and video data and audio data that can be played back at the user equipment device. The user equipment device can then send back controller feedback data which can be incorporated into the execution of the gaming application.

Game processing and graphics can be virtualized in the vRAN/xRAN network very close to the eNodeB (or 5G NR node). U-verse (and other wired/Wi-Fi) service points and some virtualized container services can also be located at the edge of the network. This can place the virtualized consoles closer to the customer, reducing latency and backbone traffic. In an embodiment, controller data, video data and audio data will be transferred to user terminal. Different gaming functions can be prioritized for latency and bandwidth. With processing shifted to the network, terminal function becomes simplified allowing compatibility across multiple mobile platforms and devices.

In an embodiment, the gaming consoles can be hosted at the edge network device via use of a virtual machine. In other embodiments, the gaming consoles can be hosted via the use of emulation of the gaming consoles at the edge network device. Virtual machines make use of CPU self-virtualization, to whatever extent it exists, to provide a virtualized interface to the real hardware. Emulators emulate hardware without relying on the CPU being able to run code directly and redirect some operations to a hypervisor controlling the virtual container. When a device is being emulated, a software-based construct has replaced a hardware component. It is possible to run a complete virtual machine on an emulated server. However, virtualization makes it possible for that virtual machine to run directly on the underlying hardware, without needing to impose an emulation tax (the processing cycles needed to emulate the hardware). While reference is made throughout the application to hosting the gaming console via a virtual machine, it is also to be appreciated that in other embodiments, emulation of the gaming consoles is also possible at the edge network device.

In various embodiments, an edge network device can comprise a processor and a memory that stores executable instructions that, when executed by the processor facilitate performance of operations. The operations can comprise instantiating a virtual machine on the edge network device in response to receiving a first request from a first user equipment device to initiate a game application. The operations can also comprise using the virtual machine to execute the game application resulting in first control data, first video data, and first audio data being generated, wherein the first control data is for control of the game application by the first user equipment device, wherein the first video data is for display by the first user equipment device, and wherein the first audio data is for play back by the first user equipment device. The operations can also comprise transmitting the first control data, the first video data, and the first audio data to the first user equipment device.

In another embodiment, method comprises receiving, by a radio access network device comprising a processor, a first request from a first user equipment device to access a game. The method can also comprise instantiating, by the radio access network device, a virtual machine on the edge network device in response to receiving the first request, wherein the virtual machine is selected from a group of virtual machines based on the game. The method can also comprise executing, by the radio access network device, a game application associated with the game in the virtual machine resulting in first control data, first video data, and first audio data, wherein the first control data is for control of the game application by the first user equipment device, wherein the first video data is for display by the first user equipment device, and wherein the first audio data is for play back by the first user equipment device. The method can also comprise transmitting, by the radio access network device, the first control data, the first video data, and the first audio data to the first user equipment device.

In another embodiment, machine-readable storage medium can comprise executable instructions that, when executed by a processor of a device, facilitate performance of operations. The operations can comprise instantiating a game console emulator on a radio access network device in response to receiving a request from a user equipment device to initiate a game application associated with the game console emulator. The operations can also comprise executing the game application in the game console emulator resulting in control data, video data, and audio data, wherein the first control data is for control of the game application by the user equipment device, wherein the first video data is for display by the user equipment device, and wherein the first audio data is for play back by the user equipment device. The operations can also comprise transmitting the control data, video data, and audio data to the user equipment device.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example block diagram of a system 100 showing an edge network device 104 with a virtual machine 108 in accordance with various aspects and embodiments of the subject disclosure. In one or more embodiments, system 100 can comprise a user equipment UEs 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. In various embodiments, system 100 is or comprises a wireless communication network serviced by one or more wireless communication network providers. In example embodiments, a UE 102 can be communicatively coupled to the wireless communication network via a network node 104.

The non-limiting term network node (or radio network node) is used herein to refer to any type of network node serving UE 102 and/or connected to other network nodes, network elements, or another network node from which the UE 102 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 104) can comprise but are not limited to: NodeB devices, base station (BS) devices, access point (AP) devices, and radio access network (RAN) devices. The network node 104 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 104 can be referred to as a gNodeB device.

In an embodiment, the network node 104 can be part of a distributed network of network nodes where network node 104 can receive a backhaul connection from a central unit (CU) or another distributed unit (DU). Similarly, network node 104 can have an access connection to another network node that receives its backhaul via network node 104. In other embodiments, the network node 104 can be part of a cloud radio access network (C-RAN) system where one or more of the functions of the radio access network are split up, and/or performed in the cloud. In an embodiment, the network node 104 can comprise an enhanced site processing system (ESPS) 106 where various network functionalities that require low latency can be performed as it is near, physically and network hierarchically, to the UE 102. ESPS 106 can include, in addition to the VM 108 that executes a gaming application, other virtual machines, and dedicated circuitry that can perform RAN functions in support of the network node 104.

Wireless communication system 100 can employ various cellular technologies and modulation schemes to facilitate wireless radio communications between devices (e.g., the UE 102 and the network node 104). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UE 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, ESPS 106 can be configured to instantiate a virtual machine 108 at the ESPS in order to execute one or more game applications. The ESPS 106 can include processors and graphics chipsets that enable the VM 108 to execute the game functions. The game application output (control data that facilitates control of the game, video data for video playback, and audio data for audio playback) can be sent to the UE 102 via a wireless transmission. By performing the processing and execution of the game application in the radio access network, the limited processing power and battery life of the UE 102 is not impacted, and the latency is reduced relative to having a cloud server instantiate the VM and execute the game application in the server. In an example, the round trip latency between the UE 102 and the network node 104 can be equal to or less then 4 ms. The ESPS 106 can also serve as the function of E-GW (edge gateway) where higher level data is routed to other ESPS within the network, or to GA-GW (gaming gateway) for communication to other networks (private and internet).

In an embodiment an advantage of this disclosure is that the game requested by the UE 102 can be a game that has processing requirements that far outstrip the processing capabilities of the UE 102. In another advantage, the ESPS 106 can instantiate a plurality of different VMs that each correspond to different game consoles. In this way, the UE 102 can be used to play games from disparate game companies, publishers, and console types.

In an example, the UE 102 can function as a thin-client device, playing back video and audio data received from the VM 108, and then pass back controller feedback data (control input from the user) to the VM 108 to control the game. In other embodiments, the UE 102 can act as a pass-through device as well and output the video, audio, and control data to a larger screen and speakers and controllers. The UE 102 can connect to these other devices via Bluetooth connections, Wi-Fi, and other wireless and/or wired connections. The UE 102 can then receive controller feedback data from a controller device and pass the controller feedback data back to the VM 108 via network node 104, for the game application to adjust execution of the game based on the feedback.

In an embodiment, the network node 104 can receive information relating to the UE 102 capabilities, (e.g., hardware information, display capabilities, audio capabilities, etc.) and VM 108 can output control data, video data, and audio data to match the device capabilities. As an example, the network node 104 can determine the screen resolution of UE 102 or the screen device connected to UE 102, and VM 108 can then generate video data that matches the screen resolution. This can minimize the amount of processing that UE 102 can perform, since UE 102 will not have to adjust the video feed to match the native resolution. If the UE 102 is connected via Bluetooth, Wi-Fi, or other connection to another screen, the UE 102 can pass the screen resolution to the network node 104 so that the VM 108 generates video data matching the resolution of the attached screen.

Figure 2:
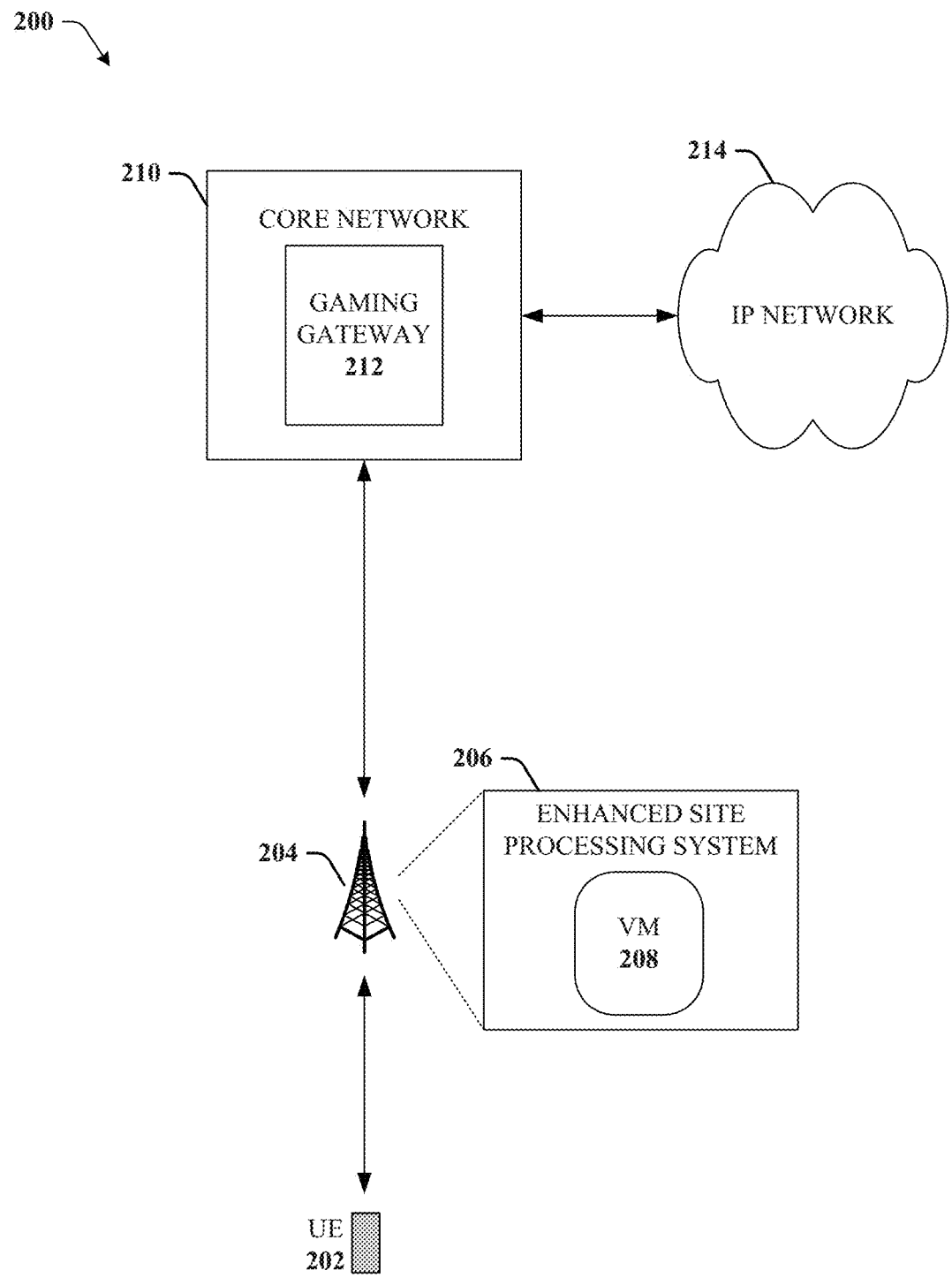
FIG. 2 illustrates an example block diagram showing an edge network device with a virtual machine receiving data from a gaming gateway in a core network in accordance with various aspects and embodiments of the subject disclosure.

Turning now to FIG. 2, illustrated is an example block diagram 200 showing an edge network device 204 with a virtual machine 208 receiving data from a gaming gateway 212 in a core network 210 in accordance with various aspects and embodiments of the subject disclosure.

In an embodiment, a UE 202 can send a request to initiate an application to the network node 204. Network node 204 can forward the request to a gaming gateway 212 in a core network 210. The gaming gateway 212 can authenticate the request by matching information in the request to subscription and/or access information. Once authentication is complete, gaming gateway 212 can send an indication to ESPS 206 to initiate instantiation of a VM 208 to execute the game application. In other embodiments, the VM 208 may be currently running, and so VM 208 can execute another instance of the game application. In other embodiment, ESPS 206 and/or gaming gateway 212 may create a new VM for every instance of a game application being executed. In such a way, the ESPS 206 could have a plurality of VMs operational, depending on the number of users connected and playing games.

In an embodiment, the UE 202 can send a request via an application layer, and can be received via an IP network 214. The UE 202 can have an application installed that enables the user to select which game to the play, and once selected, the application can send a request, via Wi-Fi, or via the mobile network which can be received by the gaming gateway 212. The application on the UE 202 can access user profile data from the gaming gateway 212 or elsewhere (e.g., via the IP network 214, which can comprise information about the games available to play, subscription plan information, and other relevant information.

The gaming gateway 212 can approve a game for game play by the UE 202, and can send an instruction to the ESPS 206 to instantiate the VM 208. In an embodiment, the ESPS 206 can comprise memory in which various game console VMs are stored and/or waiting for activation. In other embodiments, the gaming gateway 212 can initiate transfer, via the core network 210, of VM data to facilitate instantiation of the game console OS (e.g., VM 208) at ESPS 206. In an embodiment, the gaming gateway 212 can also transfer game application data to the ESPS 206. The game application data can include game executables and other data that facilitates the VM 208 operating the game. The gaming gateway 212 can also transfer user profile data to the ESPS 206. The user profile data can include saved game information, preferences, settings, and other information that enable the VM 208 to generate customized game experience for the UE 202.

In an embodiment, the UE 202 can move from an area covered by network node 204 to another area serviced by another network node. Gaming gateway 212 can determine the movement and location of the UE 202, and when service is handed over from one network node to another network node, gaming gateway 212 can also ensure that the gaming application is also transferred to another VM at the ESPS associated with the other network node. Game state information can enable the new VM to start executing the game application with little to no impact or interruption of game play. User profile information and other information can also be transferred.

In an embodiment, the user profile information can be stored in a data store/memory at the core network 210, or the gaming gateway device 212 can retrieve the user profile information from a data store/repository elsewhere (e.g., centralized gaming server, game publisher/studio, user's identified/selected repository or elsewhere) via the IP network 214.

In an embodiment, the gaming gateway 212 can facilitate various security services for the UE 202. Virtualized Private Networks and IP security (VPN/IPsec) will be designed in, similar to what we do for IMS/USP VoLTE (IP Multimedia Subsystem, Ubiquitous Service Platform, Voice Over LTE). This can also protect the core network 210 from unauthorized use as well as added security. Without this, if someone were to instantiate a VM while on VPN, it would be built to the nearest point of their Proxy in use of their VPN, not nearest to their access device. By contrast, by running the VPN service similar to how VoLTE is operated, the location information (determined via the network) can be used to identify which cellular node (e.g., network node 204) is connected to the UE 202 so that the VM 208 is built at ESPS 206 associated with network node 204 instead of another network node. In other embodiments, the gaming gateway 212 can receive location information provided by the phone (GPS, network location, etc) in order to determine at which network node to build the VM 208.

In addition to virtualization, the network based version running in VM 208 also facilitates addition of features to a game console that it didn't have before. Old gaming consoles were limited to their processing power, and technology at the time they were built. By contrast, the VM 208 can output games at very high resolution with high framerates that were hitherto not deemed possible.

Figure 3:
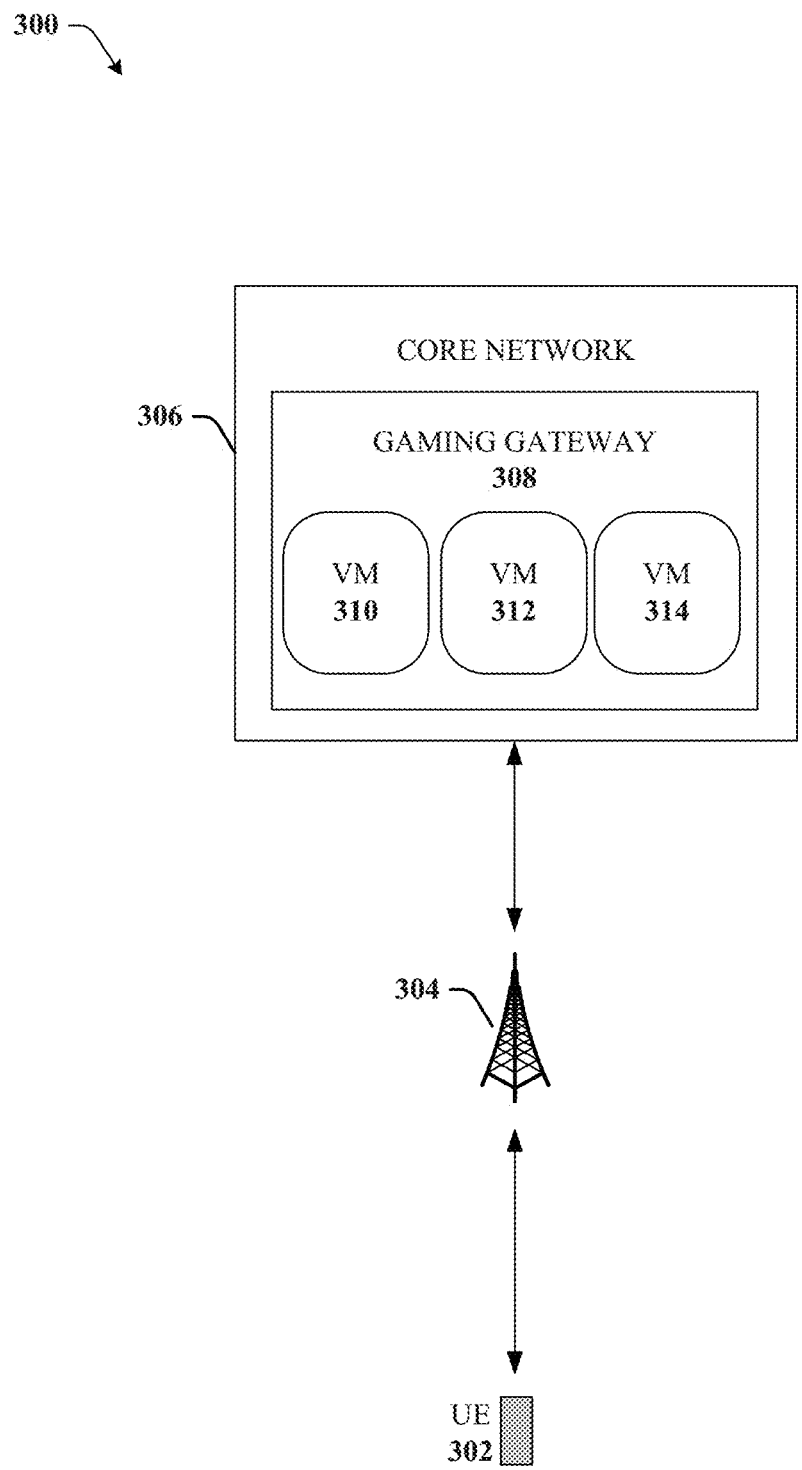
FIG. 3 illustrates an example block diagram showing a gaming gateway with a plurality of virtual machines in accordance with various aspects and embodiments of the subject disclosure.

Turning now to FIG. 3, illustrated is an example block diagram 300 showing a gaming gateway 308 in a core network 306 with a plurality of virtual machines 310, 312, and 314 in accordance with various aspects and embodiments of the subject disclosure.

Gaming gateway 308 can receive a request to start a game from UE 302, and once the gaming gateway 308 verifies the user information with the subscription information to authorize the starting of game play, the gaming gateway 308 can facilitate instantiation of a VM at the network node 304 in order to execute a game application associated with the requested game. The game could be from one or more of several different game consoles, PCs, and various operating systems, and so gaming gateway 308 can select the VM to transfer to network node 304 based on the game, type of game, operating system associated with the game, game console, and other information. The gaming gateway 308 can also preconfigure the selected VM, or send configuration information to the network node to facilitate the network node 304's configuration of the VM (e.g., VM 310) based on other information received from the UE 302 such as the device capabilities and other information.

Figure 4:
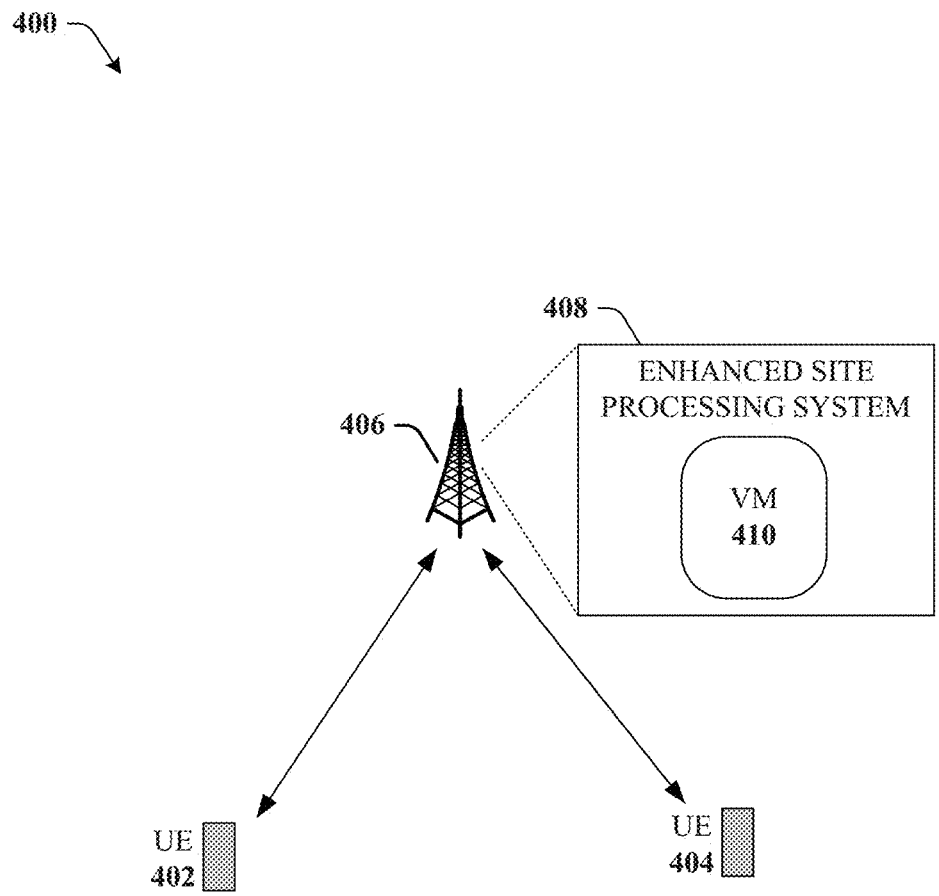
FIG. 4 illustrates an example block diagram showing an edge network device with a virtual machine that provides gaming as a service to two user equipment devices in accordance with various aspects and embodiments of the subject disclosure.

Turning now to FIG. 4, illustrated is an example block diagram 400 showing an edge network device 406 with a virtual machine 410 installed on an ESPS 408 that provides gaming as a service to two user equipment devices 402 and 404 in accordance with various aspects and embodiments of the subject disclosure.

In an embodiment, ESPS 408 can initiate a VM 410 in response to receiving a request to play a game from UE 402. The VM can be selected from a set of VMs based on the type of game, console type, etc. Then UE 404 can also send a request to play the same game or a different game, and once approved by the gaming gateway (e.g., gaming gateway 212 or 308) the ESPS can facilitate execution of the game for UE 404.

In an embodiment, if the game requested is the same game, or is another game on the same console, VM 410 can execute same or other game application in another instance of the application, and network node 406 can transfer the output of the game execution (control data, video data, audio data, etc.) to the UE 404. In other embodiments, the ESPS 408 can instantiate another VM to facilitate UE 404, even if the game requested by UE 404 is the same as that requested by UE 402.

In an embodiment, UE 402 and UE 404 can jointly play a game that is executed by VM 410. The game can be a multiplayer game, and the users can interact with each other within the game environment. This can enable gamers to play against other gamers in the neighborhood (share same cell site), or county (TAC/LAC boundary) on gaming consoles that didn't have the functionality before.

Figure 5:
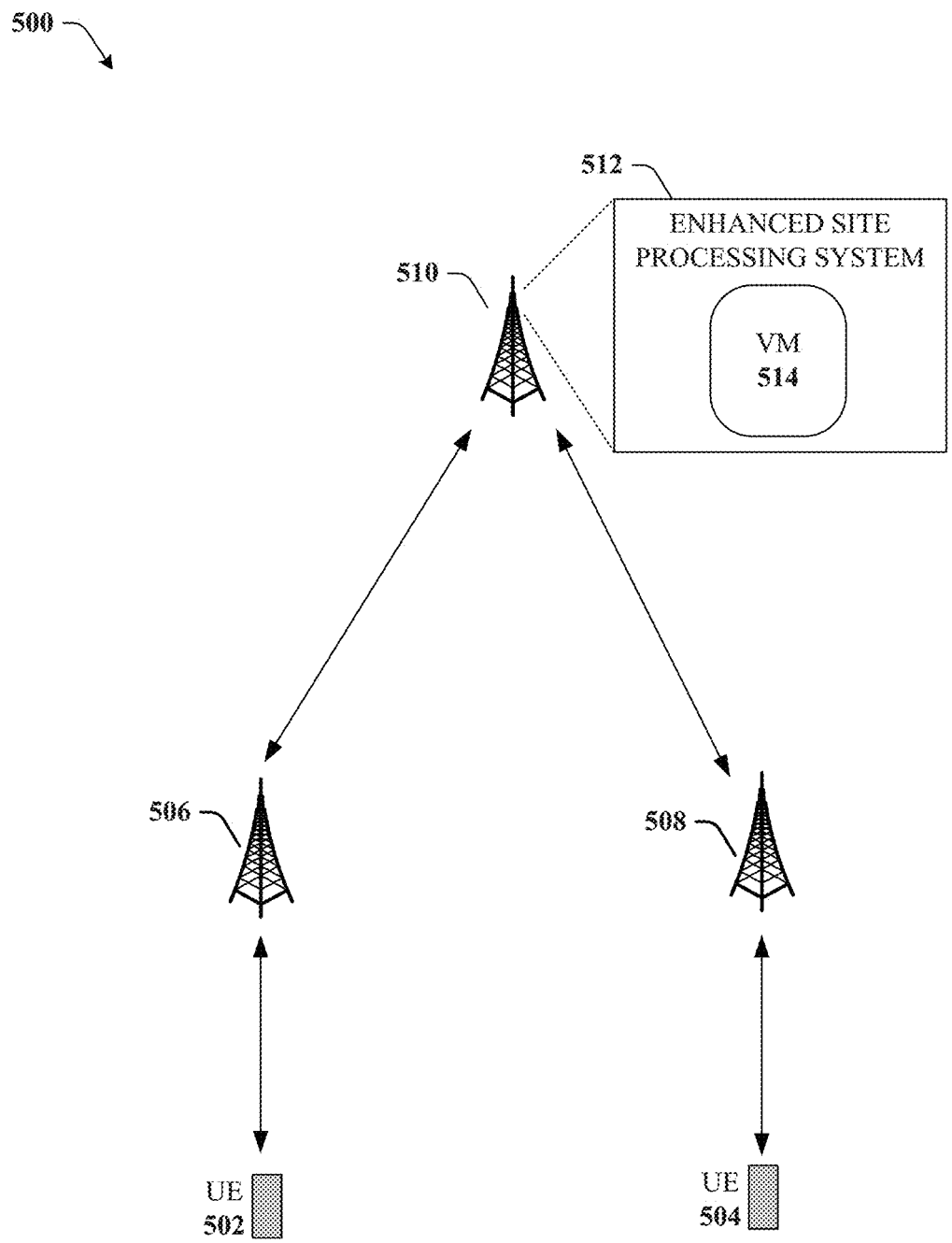
FIG. 5 illustrates an example block diagram showing a radio access network device with a virtual machine that provides gaming as a service to two user equipment devices that are connected to different radio access network devices in accordance with various aspects and embodiments of the subject disclosure.

Turning now to FIG. 5, illustrated is an example block diagram 500 showing a radio access network device with a virtual machine that provides gaming as a service to two user equipment devices that are connected to different radio access network devices in accordance with various aspects and embodiments of the subject disclosure.

In an embodiment, a radio access network can be part of a distributed network where one or more network nodes can receive a backhaul link from another network node. In this way, a centralized unit (CU) can service one or more distributed units (DU) and more efficiently service an area and expand the reach of the network. In an embodiment then, if two or more devices (e.g., UE 502 and 504) are located in areas without overlapping network coverage and thus are serviced by different network nodes 506 and 508 send requests to play a game to the network, instead of instantiating virtual machines at ESPS sites at both network node 506 and network node 508, the radio access network and/or gaming gateway can determine that it might be more efficient to instantiate a single VM 514 at ESPS 512 attached to network node 510. VM 514 can then output control data, video data, and audio data to both UE 502 and 504 and network node 510 can deliver the data to UE 502 and 504 via network node 506 and 508 respectively.

The gaming gateway which facilitates the instantiation of the VM 514 can determine the latency associated with communications between the network node 510 and the UEs 502 and 504 to ensure that the latencies stay within acceptable limits. If the latencies go over the latency threshold, the network nodes can instantiate VMs closer to the UEs (e.g., at network nodes 506 and 508).

In an embodiment, UE 502 can request to play the game first, and the network can run the game from an ESPS associated with network node 506. If, at a later time, UE 504 requests the game, the network can determine that the latency, if the game were run at VM 514 at network node 510, would be lower than the threshold latency, then the game can transfer from network node 506 to network node 510 in order to more efficiently serve the two UE devices 502 and 504.

In an embodiment, the network can take into consideration preference information when determining how far back hierarchically in the network to instantiate a VM. Different users may have different preferences for game latency and lag. In an embodiment, various incentives can be provided to the users to set their latency preferences higher (e.g., higher latency is allowable) so that there might be more opportunity to jointly serve UEs from further back in the network as shown in FIG. 5. Reduced rates for subscriptions and game offerings can be provided for users that increase their playable latency thresholds.

In other embodiments, the network can take into consideration the requirements of the game. Some games may be more sensitive to latency, and so depending on the game, the network can set different latency thresholds. Information about the latency threshold can come from the game publishers or based on testing performed by the network and/or network operators, or based on user feedback.

Figure 6:
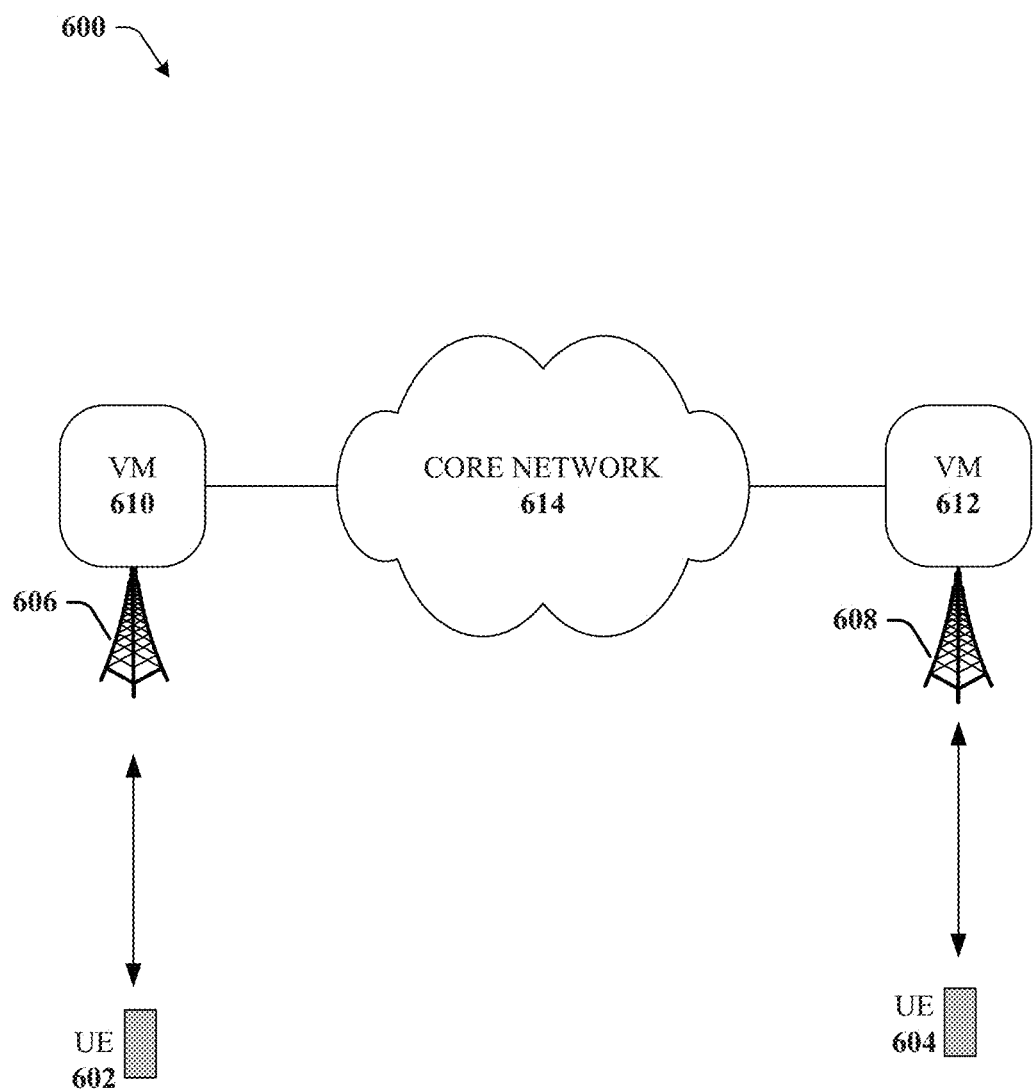
FIG. 6 illustrates an example block diagram showing two radio access network devices with virtual machines that provides gaming as a service to two user equipment devices in accordance with various aspects and embodiments of the subject disclosure.

Turning now to FIG. 6, illustrated is an example block diagram 600 showing two radio access network devices with virtual machines that provides gaming as a service to two user equipment devices in accordance with various aspects and embodiments of the subject disclosure.

In an embodiment, UE 602 and UE 604, in disparate regions, can play a multiplayer game and have VMs 610 and 612 instantiated at network nodes 606 and 608 respectively. The VMs can handle execution of the game application and transfer game output to the UEs 602 and 604 independently, but share game data relevant to the multiplayer aspect of the game via a core network 614. The game data shared can enable the players to interact with each other in the gaming environment, but instead of running the games jointly at one location, to reduce the latency and lag, the games can be executed at the edge of the network, e.g., at network nodes 606 and 608.

Figure 7:
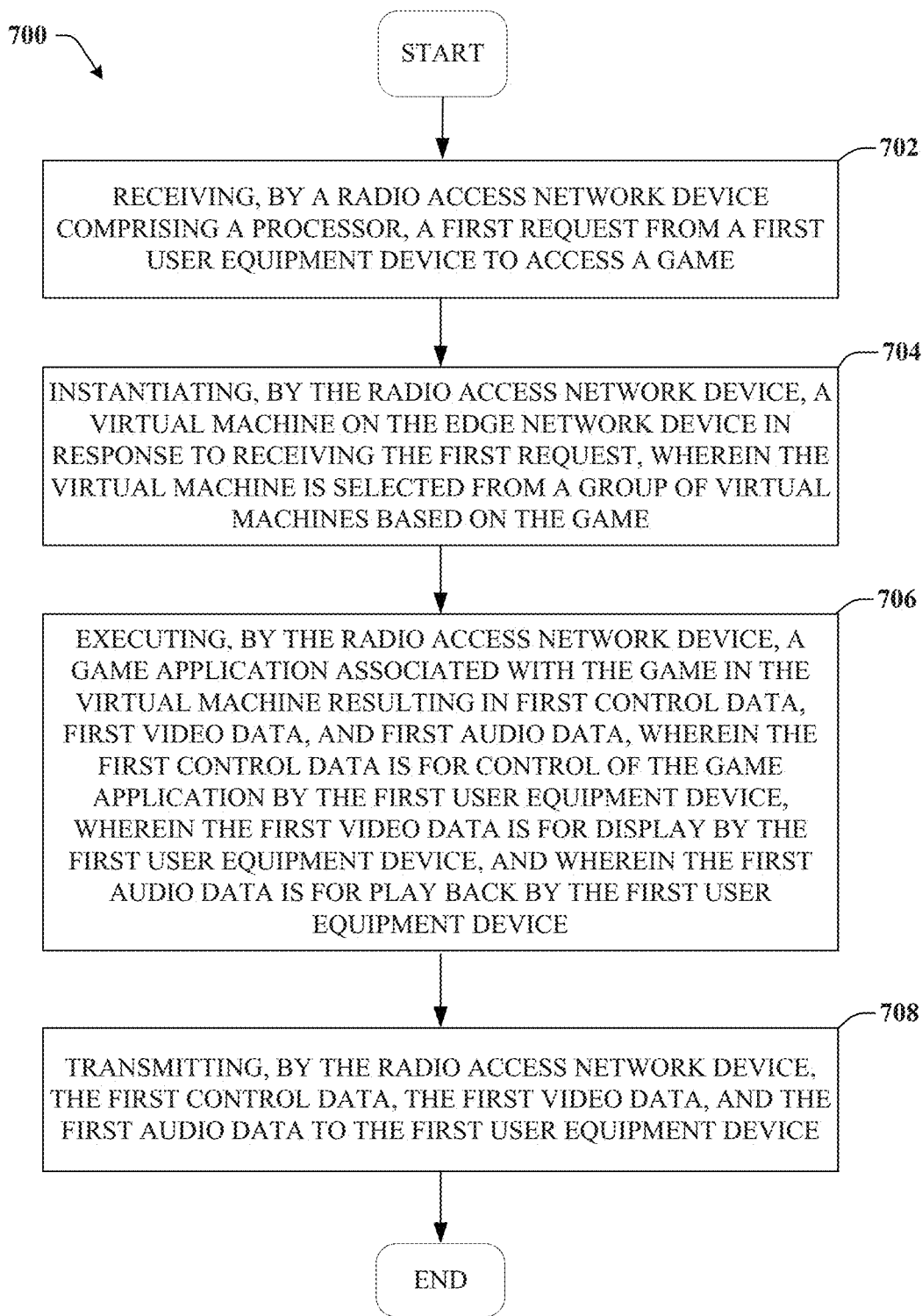
FIG. 7 illustrates an example method for facilitating virtualized gaming as a network service in accordance with various aspects and embodiments of the subject disclosure.
Figure 8:
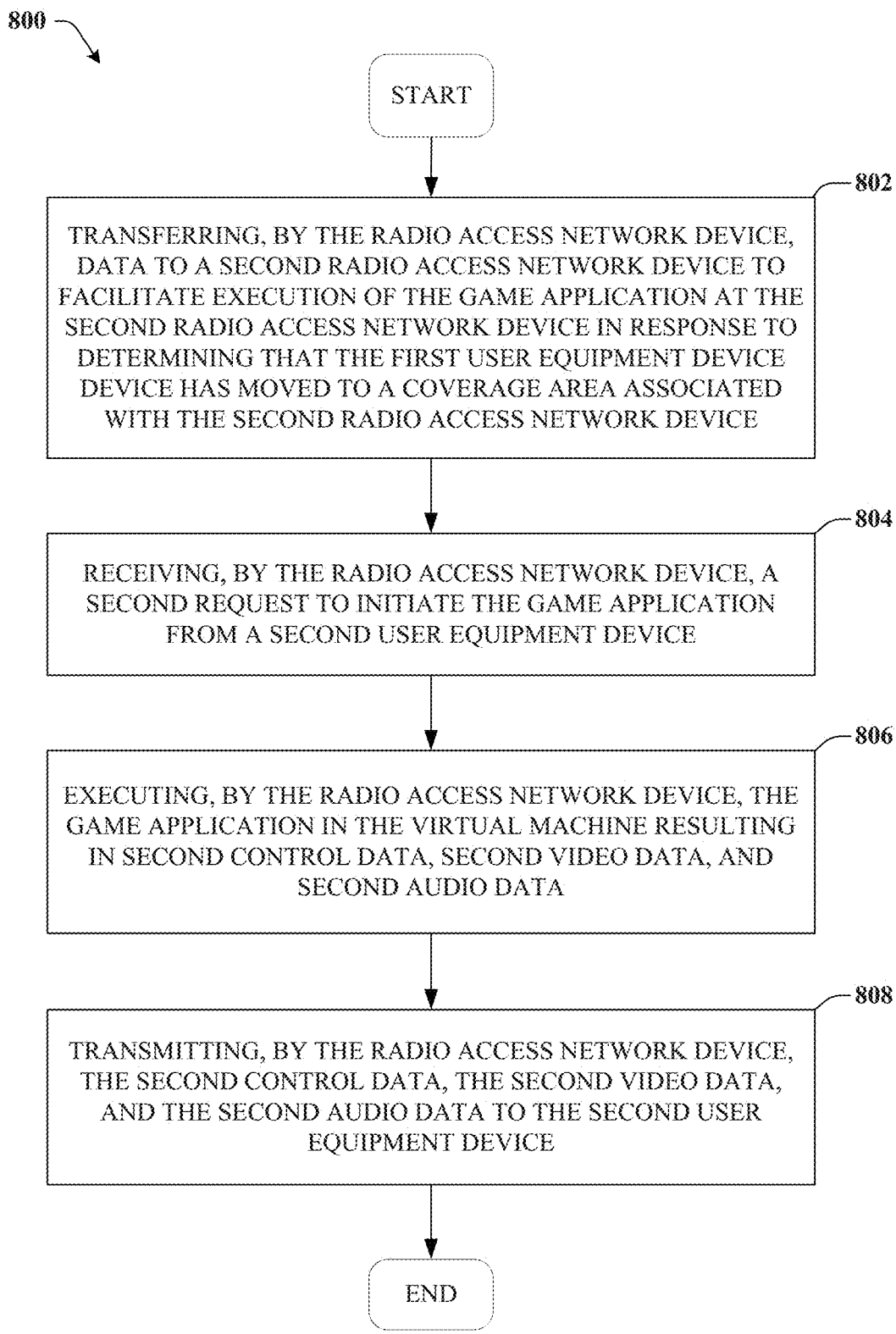
FIG. 8 illustrates an example method for facilitating virtualized gaming as a network service in accordance with various aspects and embodiments of the subject disclosure.

FIGS. 7-8 illustrates a process in connection with the aforementioned systems. The processes in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates example method 700 for facilitating virtualized gaming as a network service in accordance with various aspects and embodiments of the subject disclosure.

Method 700 can begin at 702 where the method includes receiving, by a radio access network device comprising a processor, a first request from a first user equipment device to access a game.

At 704, the method includes instantiating, by the radio access network device, a virtual machine on the edge network device in response to receiving the first request, wherein the virtual machine is selected from a group of virtual machines based on the game.

At 706, the method includes executing, by the radio access network device, a game application associated with the game in the virtual machine resulting in first control data, first video data, and first audio data, wherein the first control data is for control of the game application by the first user equipment device, wherein the first video data is for display by the first user equipment device, and wherein the first audio data is for play back by the first user equipment device.

At 708, the method includes transmitting, by the radio access network device, the first control data, the first video data, and the first audio data to the first user equipment device.

FIG. 8 illustrates example method 800 for facilitating virtualized gaming as a network service in accordance with various aspects and embodiments of the subject disclosure.

Method 800 can begin at 802 wherein the method includes transferring, by the radio access network device, data to a second radio access network device to facilitate execution of the game application at the second radio access network device in response to determining that the first user equipment device has moved to a coverage area associated with the second radio access network device.

At 804, the method can include receiving, by the radio access network device, a second request to initiate the game application from a second user equipment device.

At 806, the method can include executing, by the radio access network device, the game application in the virtual machine resulting in second control data, second video data, and second audio data.

At 808, the method can include transmitting, by the radio access network device, the second control data, the second video data, and the second audio data to the second user equipment device.

Figure 9:
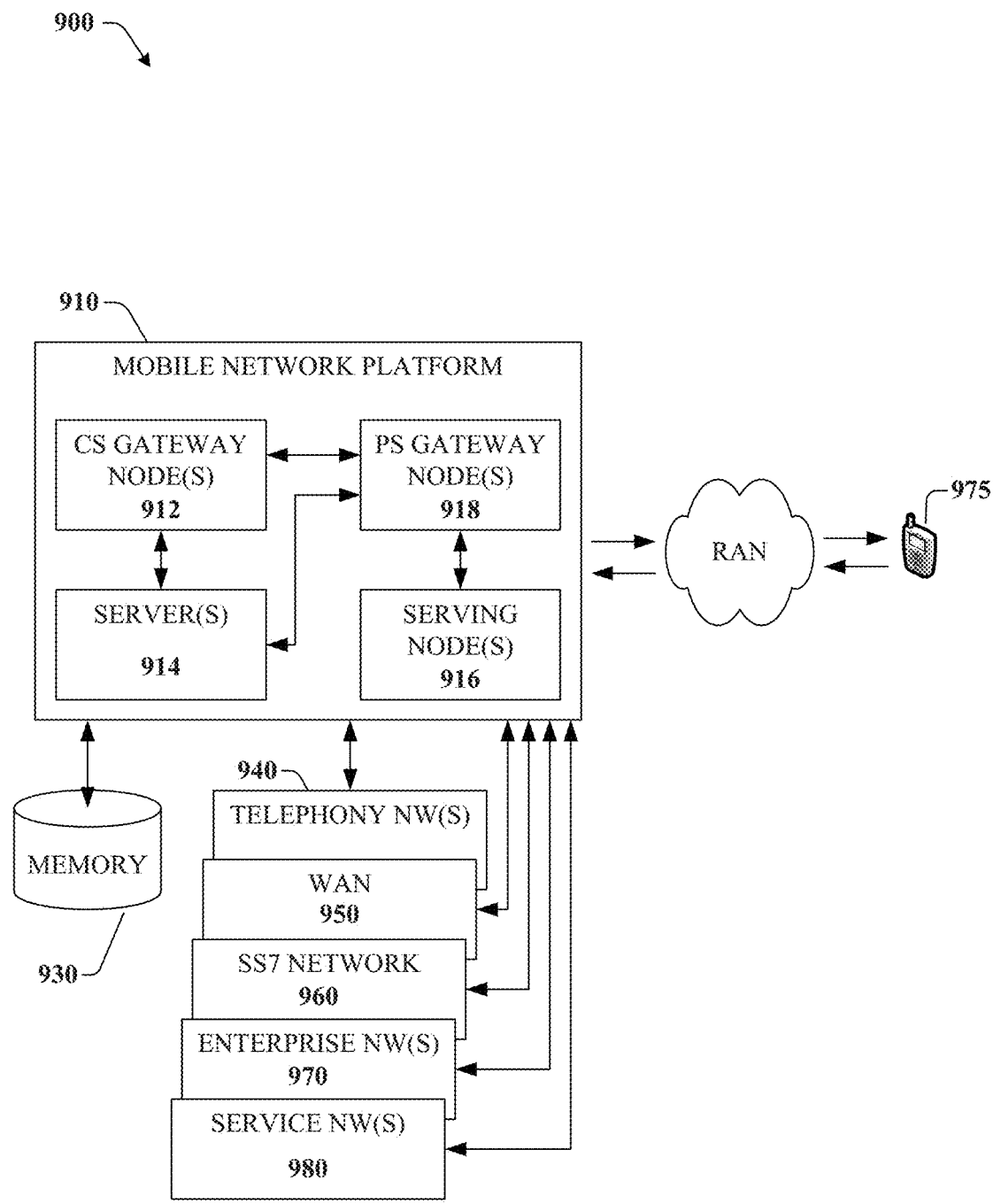
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
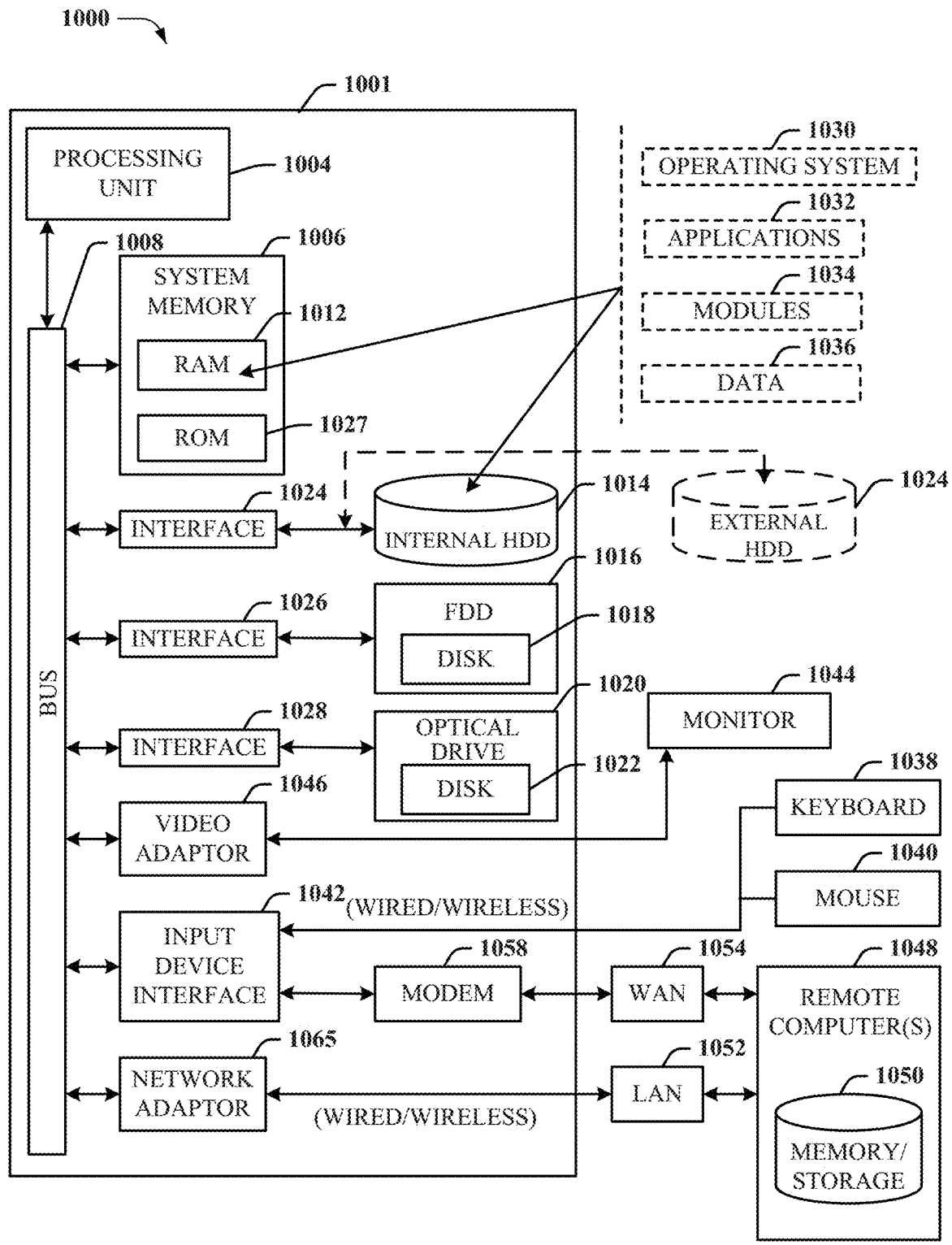
FIG. 10 illustrates an example block diagram of a computer that can be operable to execute processes and methods in accordance with various aspects and embodiments of the subject disclosure

Referring now to FIG. 10, there is illustrated a block diagram of a computer 1000 operable to execute the functions and operations performed in the described example embodiments. For example, a network node (e.g., network node 106, network node 204, e.g.) or ESPS 106, 206, etc., may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. First edge network equipment, comprising:
a processor; and
a memory that stores executable instructions that, when executed by the processor, facilitate performance of operations, comprising:
instantiating a first virtual machine on the first edge network equipment in response to receiving a first request from a first user equipment to initiate a game application;
using the first virtual machine to execute the game application resulting in first control data, first video data, and first audio data being generated, wherein the first control data is for control of the game application by the first user equipment, wherein the first video data is for display by the first user equipment, and wherein the first audio data is for play back by the first user equipment;
receiving a second request to initiate the game application from a second user equipment;
determining that the second user equipment is connected to second edge network equipment that has a second coverage area that does not overlap a first coverage area of the first edge network equipment; and
transmitting a request to instantiate a second virtual machine on common edge network equipment, wherein the common edge network equipment has a first latency with the first user equipment and a second latency with the second user equipment that are lower than a threshold latency.

2. The first edge network equipment of claim 1, wherein the operations further comprise:
receiving controller feedback data from the first user equipment, and wherein the controller feedback data is associated with a user interaction with the game application.

3. The first edge network equipment of claim 1, wherein using the first virtual machine to execute the game application is based on controller feedback data received from the first user equipment.

4. The first edge network equipment of claim 1, wherein the operations further comprise:
retrieving game data that facilitates execution of the game application using the first virtual machine from a gaming gateway device that is part of a core network in response to receiving the first request from the first user equipment to initiate the game application.

5. The first edge network equipment of claim 1, wherein the operations further comprise:
transferring data to the second edge network equipment to facilitate execution of the game application at the second edge network equipment in response to determining that the first user equipment has moved to a coverage area associated with the second edge network equipment.

6. The first edge network equipment of claim 1, wherein the operations further comprise:
selecting the first virtual machine from a group of virtual machines based on the game application, and wherein respective ones of the group of virtual machines correspond to respective game console types.

7. The first edge network equipment of claim 1, wherein the operations further comprise:
determining that the first user equipment is in a coverage area of the first edge network equipment based on a physical location of the first user equipment.

8. The first edge network equipment of claim 1, wherein the first user equipment is connected to core network equipment associated with a core network via a virtual private network connection.

9. The first edge network equipment of claim 1, wherein the operations further comprise:
receiving the second request to initiate the game application from the second user equipment;
using the first virtual machine to execute the game application resulting in second control data, second video data, and second audio data being generated, wherein the second control data is for control of the game application by the second user equipment, wherein the second video data is for display by the second user equipment, and wherein the second audio data is for play back by the second user equipment; and
transmitting the second control data, the second video data, and the second audio data to the second user equipment.

10. The first edge network equipment of claim 1, wherein the operations further comprise:
determining that the second user equipment is associated with the second edge network equipment that has the second coverage area that does not overlap the first coverage area of the first edge network equipment; and
instantiating the first virtual machine in the common edge network equipment.

11. A method, comprising:
receiving, by first radio access network equipment comprising a processor, a first request from a first user equipment to access a game;
instantiating, by the first radio access network equipment, a first virtual machine on edge network equipment in response to receiving the first request, wherein the first virtual machine is selected from a group of virtual machines based on the game;
executing, by the first radio access network equipment, a game application associated with the game in the first virtual machine resulting in first control data, first video data, and first audio data, wherein the first control data is for control of the game application by the first user equipment, wherein the first video data is for display by the first user equipment, and wherein the first audio data is for play back by the first user equipment;
receiving, by the first radio access network equipment, a second request to initiate the game application from a second user equipment;
determining, by the first radio access network equipment, that the second user equipment is connected to second radio access network equipment that has a second coverage area that does not overlap a first coverage area of the first radio access network equipment; and
transmitting, by the first radio access network equipment, a request to instantiate a second virtual machine on common radio access network equipment, wherein the common radio access network equipment has a first latency with the first user equipment and a second latency with the second user equipment that are lower than a threshold latency.

12. The method of claim 11, further comprising:
receiving, by the first radio access network equipment, controller feedback data from the first user equipment, wherein the controller feedback data adjusts execution of the game application based on a user interaction.

13. The method of claim 11, wherein executing the game application is based on the controller feedback data from the first user equipment.

14. The method of claim 11, further comprising:
forwarding, by the first radio access network equipment, the first request to a gaming gateway device; and
in response to forwarding the first request, receiving, by the first radio access network equipment, game data that facilitates execution of the game application on the first virtual machine and user profile data from the gaming gateway device.

15. The method of claim 11, further comprising:
transferring, by the first radio access network equipment, data to the second radio access network equipment to facilitate execution of the game application at the second radio access network equipment in response to determining that the first user equipment has moved to a coverage area associated with the second radio access network equipment.

16. The method of claim 11, further comprising:
executing, by the first radio access network equipment, the game application in the first virtual machine resulting in second control data, second video data, and second audio data; and
transmitting, by the first radio access network equipment, the second control data, the second video data, and the second audio data to the second user equipment.

17. The method of claim 11, further comprising:
receiving, by the first radio access network equipment, the second request to initiate the game application from the second user equipment.

18. A non-transitory machine-readable medium, comprising executable instructions that, when executed by a processor of a device, facilitate performance of operations, comprising:
instantiating a first game console emulator on first radio access network equipment in response to receiving a first request from a first user equipment to initiate a game application associated with the first game console emulator;

executing the game application in the first game console emulator resulting in control data, video data, and audio data, wherein the control data is for control of the game application by the first user equipment, wherein the video data is for display by the first user equipment, and wherein the audio data is for render by a sound output of the first user equipment;

receiving a second request to initiate the game application from a second user equipment;

determining that the second user equipment is connected to second radio access network equipment that has a second coverage area that does not overlap a first coverage area of the first radio access network equipment; and transmitting a request to instantiate a second game console emulator on common radio access network equipment, wherein the common radio access network equipment has a first latency with the first user equipment and a second latency with the second user equipment that are lower than a threshold latency.

19. The non-transitory machine-readable medium of claim 18, wherein the operations further comprise:

accessing game data that facilitates execution of the game application on the first game console emulator and user profile data from a gaming gateway device associated with a core network in response to receiving the request from the first user equipment to initiate the game application.

20. The non-transitory machine-readable medium of claim 18, wherein the operations further comprise:

receiving controller feedback data from the first user equipment, and wherein the controller feedback data is associated with a user interaction with the game application.

\* \* \* \* \*